United States Patent
Schuller et al.

(10) Patent No.: US 11,577,752 B2
(45) Date of Patent: Feb. 14, 2023

(54) METHOD FOR ADJUSTING FULLY AUTOMATIC VEHICLE GUIDANCE FUNCTIONS IN A PREDEFINED NAVIGATION ENVIRONMENT AND MOTOR VEHICLE

(71) Applicant: AUDI AG, Ingolstadt (DE)

(72) Inventors: Florian Schuller, Ismaning (DE); Christian Feist, Ingolstadt (DE)

(73) Assignee: Audi AG, Ingolstadt (DE)

( * ) Notice: Subject to any disclaimer, the term of this patent is extended or adjusted under 35 U.S.C. 154(b) by 7 days.

(21) Appl. No.: 16/764,932

(22) PCT Filed: Oct. 12, 2018

(86) PCT No.: PCT/EP2018/077840
§ 371 (c)(1),
(2) Date: May 18, 2020

(87) PCT Pub. No.: WO2019/105640
PCT Pub. Date: Jun. 6, 2019

(65) Prior Publication Data
US 2021/0078610 A1    Mar. 18, 2021

(30) Foreign Application Priority Data

Nov. 28, 2017 (DE) .......................... 102017221286.1

(51) Int. Cl.
*B60W 60/00* (2020.01)
*B60W 30/095* (2012.01)

(52) U.S. Cl.
CPC .. *B60W 60/00184* (2020.02); *B60W 30/0956* (2013.01); *B60W 60/0027* (2020.02);
(Continued)

(58) Field of Classification Search
CPC ....... B60W 60/00184; B60W 60/0027; B60W 30/0956; B60W 2556/10; B60W 2554/4044; B60W 2556/45
See application file for complete search history.

(56) References Cited

U.S. PATENT DOCUMENTS

| | | |
|---|---|---|
| 6,151,539 A | 11/2000 | Bergholz et al. |
| 9,715,829 B2 | 7/2017 | Buchholz et al. |

(Continued)

FOREIGN PATENT DOCUMENTS

| | | |
|---|---|---|
| CN | 104240535 A | 12/2014 |
| CN | 107102642 A | 8/2017 |

(Continued)

OTHER PUBLICATIONS

International Search Report and Written Opinion of the International Searching Authority directed to related International Patent Application No. PCT/EP2018/077840, dated Feb. 18, 2019, with attached English-language translation; 31 pages.

(Continued)

*Primary Examiner* — Behrang Badii
*Assistant Examiner* — Jay Khandpur
(74) *Attorney, Agent, or Firm* — Sterne, Kessler, Goldstein & Fox P.L.L.C.

(57) ABSTRACT

The invention relates to a method for adjusting fully automatic vehicle guidance functions, which are realized by means of a vehicle system of a motor vehicle, during the operation of the motor vehicles in a predefined navigation environment. A stationary infrastructure device that communicates with the motor vehicles is associated with the navigation environment. Function limits of each vehicle guidance function are defined by means of limit operation parameters of the vehicle guidance function. Current traffic situation information describing dynamic objects in the (Continued)

Figure 1:
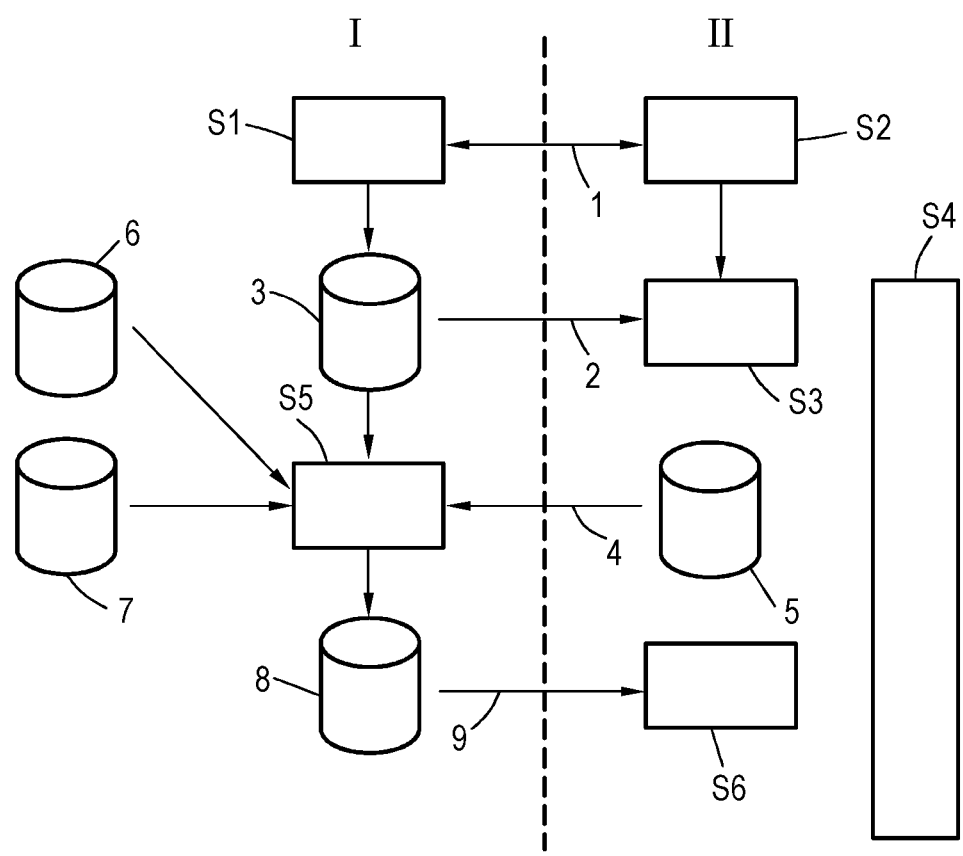

navigation environment is determined by the infrastructure device by means of environment sensors of the navigation environment. The current traffic situation information is used, together with a digital map describing stationary objects and properties of the navigation environment, to determine at least one piece of risk information for each motor vehicle.

18 Claims, 2 Drawing Sheets

(52) U.S. Cl.
CPC . *B60W 2554/4044* (2020.02); *B60W 2556/10* (2020.02); *B60W 2556/45* (2020.02)

(56) References Cited

U.S. PATENT DOCUMENTS

| | | | |
|---|---|---|---|
| 10,269,250 B2 | 4/2019 | Altinger et al. | |
| 10,787,169 B2 | 9/2020 | Bonnet et al. | |
| 2007/0282530 A1 | 12/2007 | Meister | |
| 2011/0015850 A1* | 1/2011 | Tange | B60T 8/17557 701/116 |
| 2012/0239253 A1 | 9/2012 | Schmidt et al. | |
| 2015/0112504 A1* | 4/2015 | Binion | G07C 5/008 701/1 |
| 2015/0217763 A1 | 8/2015 | Reichel et al. | |
| 2017/0101056 A1* | 4/2017 | Park | G08G 1/04 |
| 2017/0305420 A1 | 10/2017 | Densens et al. | |
| 2018/0024564 A1* | 1/2018 | Matsuda | B60W 30/095 701/25 |
| 2018/0025317 A1* | 1/2018 | Dominguez | G06Q 10/0832 705/332 |
| 2018/0061253 A1* | 3/2018 | Hyun | G08G 1/0175 |
| 2018/0074505 A1* | 3/2018 | Lv | G05D 1/0246 |
| 2018/0240343 A1 | 8/2018 | Nordbruch | |
| 2018/0370526 A1* | 12/2018 | Ohmura | G06V 20/584 |
| 2019/0064813 A1* | 2/2019 | Binet | B60W 30/00 |

FOREIGN PATENT DOCUMENTS

| | | | | |
|---|---|---|---|---|
| CN | 107257994 A | | 10/2017 | |
| CN | 108830477 A | * | 12/2017 | |
| CN | 108830477 A | * | 12/2017 | |
| CN | 108830477 A | * | 11/2018 | .......... B60R 25/102 |
| DE | 102004035856 A1 | | 3/2005 | |
| DE | 10356309 A1 | | 6/2005 | |
| DE | 102010022706 A1 | | 12/2011 | |
| DE | 102010023603 A1 | | 12/2011 | |
| DE | 102011014083 A1 | | 9/2012 | |
| DE | 102012009297 A1 | | 12/2012 | |
| DE | 102012016802 A1 | | 2/2014 | |
| DE | 102014013672 A1 | | 4/2015 | |
| DE | 102014014120 A1 | | 4/2015 | |
| DE | 102014225103 A1 | | 6/2016 | |
| DE | 102015202469 A1 | | 8/2016 | |
| DE | 102015204861 A1 | | 9/2016 | |
| DE | 102015217388 A1 | | 3/2017 | |
| DE | 102016201249 A1 | | 8/2017 | |
| EP | 0913751 A1 | | 5/1999 | |
| EP | 1590193 B1 | * | 2/2010 | .......... B60K 31/0008 |
| WO | WO-2013051083 A1 | * | 4/2013 | .......... B60W 10/184 |
| WO | WO-2016016394 A1 | * | 2/2016 | .............. G06K 9/325 |
| WO | WO 2017/084786 A1 | | 5/2017 | |
| WO | WO-2018066133 A1 | * | 4/2018 | .......... B60W 30/095 |

OTHER PUBLICATIONS

International Preliminary Report on Patentability directed to related International Patent Application No. PCT/EP2018/077840, completed Oct. 30, 2019, with attached English-language translation; 13 pages.

* cited by examiner

METHOD FOR ADJUSTING FULLY AUTOMATIC VEHICLE GUIDANCE FUNCTIONS IN A PREDEFINED NAVIGATION ENVIRONMENT AND MOTOR VEHICLE

TECHNICAL FIELD

The invention relates to a method for adjusting fully automatic vehicle guidance functions, which are realized by means of a vehicle system of a motor vehicle, during the operation of the motor vehicles in a predefined navigation environment, in particular a parking environment, where a stationary infrastructure device that communicates with the motor vehicles is associated with the navigation environment and function limits of each vehicle guidance function are defined by means of limit operation parameters of the vehicle guidance function. The invention also relates to a motor vehicle.

BACKGROUND

The autonomous operation of motor vehicles, in particular the implementation of fully automatic vehicle guidance functions, is a current, important research topic. The corresponding vehicle systems carry out journey planning to implement the vehicle guidance function, both in terms of the route and a trajectory that is currently to be implemented. For this purpose, there is a large amount of information in the motor vehicles, in particular sensor data from a motor vehicle-side sensor system, which describe the current operating state of the motor vehicle and the current traffic situation in the detection area around the motor vehicle, as well as digital map data which can be used for a supplementary description of the current traffic situation and for route planning. An important further aspect of fully automated vehicle guidance functions is safety, which is why the journey planning to avoid collisions with static or dynamic obstacles as well as additional safety systems that serve to prevent collisions can be provided within the motor vehicle.

In the context of fully automatic vehicle guidance, motor vehicles can also communicate with infrastructure devices, in particular those that are assigned to a currently used, predefined navigation environment, for example a parking environment such as a parking garage. A corresponding communication link is usually established via short-range communication, for example WLAN (Wireless Local Area Network). So far, different concepts for fully automated vehicle guidance in such navigation environments, in particular parking environments, have been proposed, for example those in which the coordination of the fully automated operation is carried out to a greater extent by the infrastructure device or also those in which only specifications, for example destination points, are provided by the infrastructure device while the respective motor vehicle autonomously implements its fully automatic vehicle guidance based on these specifications.

The autonomous operation of motor vehicles outside of such predetermined navigation environments, for example parking environments, is more complex in design. For example, DE 10 2014 014 120 A1 describes a large number of conditions for the autonomous operation of a vehicle on a road ahead that must be met in order to activate a fully automatic vehicle guidance function. These conditions include, for example, that there is a structural separation on at least one side of a current lane of the vehicle, one lane of the vehicle has a minimum lane width, the range of crests and depressions that significantly restrict the range of environmental detection sensors is present, the number of lanes does not change, no tunnels exist and the like. Traffic reports can also be taken into account. It is therefore a matter of substantially static properties of a section of the road ahead, which are at most variable over long time scales, as a condition for permitting autonomous operation.

DE 10 2014 013 672 A1 relates to a method and a system for securing autonomous or semi-autonomous operation of vehicles on a traffic route network. Information on the suitability of a route for autonomous or partially autonomous operation of vehicles is determined, where an external server that collects the information on the suitability determines permission information based on the permissibility of the route for autonomous or partially autonomous operation of vehicles and provides it to the vehicles. The information on suitability can include a justification and/or an explanation of the suitability determined, in order not to result in temporary causes for non-issuance and the permission information. However, the permission information can take into account current traffic information on traffic jams, accidents, construction sites, or the like. Here, too, it is a matter of the basic admissibility of fully automatic vehicle guidance depending on extremely slowly changing or even static circumstances.

In order to ensure the greatest possible safety when using an automatic vehicle guidance function, the fully automatic vehicle guidance is usually set with function limits, for example maximum permissible speeds, maximum permissible changes in various operating parameters, permitted driving maneuvers, and the like. These function limits can be determined by limit operation parameters of the vehicle guidance function. The function limits are based on a risk assessment based on the detection of the traffic situation by the motor vehicle. For example, due to the spatially restricted detection areas of environment sensors of the motor vehicle, there is a restricted information horizon or information radius of a motor vehicle. This means that the function limits, for example the maximum speed, are designed according to the technical possibilities in the motor vehicle, with certain scenarios/traffic situations also being able to completely rule out autonomous operation of the motor vehicle by means of the fully automatic vehicle guidance function. However, such restrictions have an unfavorable effect on driver reception after the general suitability of the vehicle guidance function is reduced by low-risk behavior. For example, very slow speeds, long plausibility checks, possibly when the vehicle is at a standstill, and the like can occur due to the function limits. In other words, the function limits are chosen with regard to the "worst case."

BRIEF DESCRIPTION OF THE DRAWINGS/FIGURES

FIG. 1 illustrates a flowchart to explain a method, according to some embodiments of this disclosure.

Figure 2:
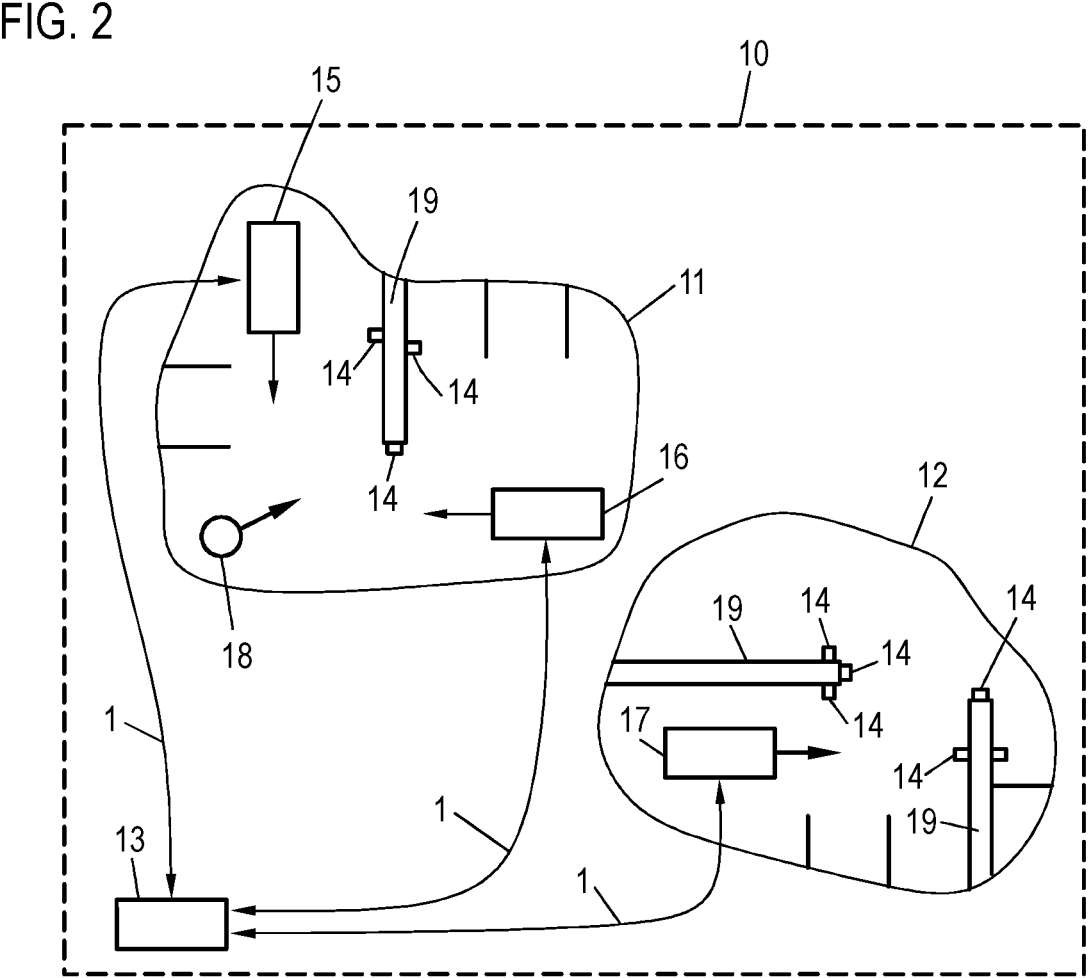

FIG. 2 schematically illustrates a navigation environment with traffic situations, according to some embodiments of this disclosure.

Figure 3:
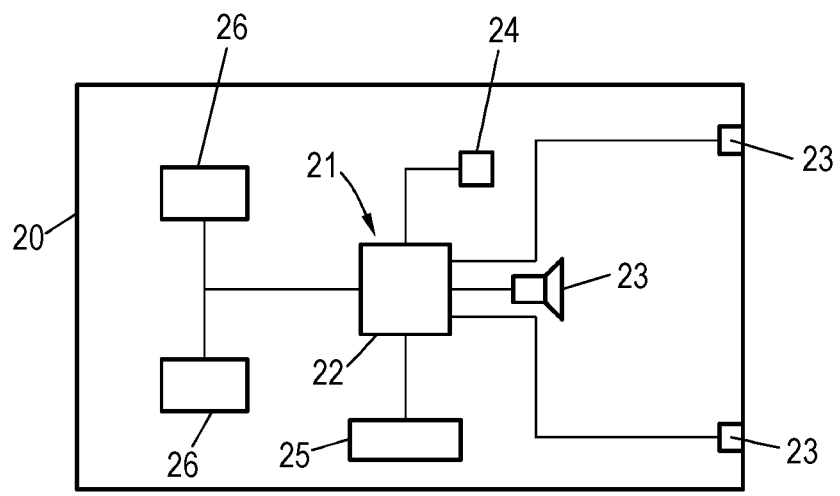

FIG. 3 illustrates a schematic diagram of a motor vehicle, according to some embodiments of this disclosure.

DETAILED DESCRIPTION

The invention is therefore based on the object of specifying a possibility for improved risk assessment and thus situation-dependent extensions of the function limits of a fully automatic vehicle guidance function of a motor vehicle.

To achieve this object, according to the invention, in a method of the type mentioned at the outset, current traffic situation information describing dynamic objects in the navigation environment is determined by the infrastructure device by means of environment sensors of the navigation environment, at least some of which environment sensors are fixedly installed so as to be stationary, and the current traffic situation information is used, together with a digital map describing stationary objects and properties of the navigation environment, to determine at least one piece of risk information for each motor vehicle among the dynamic objects, which risk information describes a hazard potential and/or property damage potential, where the motor-vehicle-specific risk information is transmitted to the associated motor vehicles and, in accordance with the risk information, the vehicle system adjusts the limit operation parameters to tighter function limits in the case of risk information describing a higher risk and to wider function limits in the case of risk information describing a lower risk.

According to the invention, it is therefore proposed to provide a continuous (therefore cyclical) risk assessment with regard to the hazard/property damage potential by means of an active infrastructure device with the possibility of monitoring dynamic objects in the navigation environment, additional information being available for this purpose in particular by means of the environment sensors associated with the navigation environment, which would be unknown to the individual motor vehicles, so that a complete picture of the (dynamic) traffic situation within the navigation environment can be determined as traffic situation information. Of course, further input data can also be included in the determination of the traffic situation information, for example position information transmitted by motor vehicles and/or sensor data of the motor vehicle sensors, and/or operating data of the respective motor vehicles. However, an embodiment is preferred in which at least mainly the sensor data of the environment sensors are used.

The vehicle-specific risk assessment, described by means of risk information, for a motor vehicle communicating with the infrastructure device via a corresponding communication device is made available to the corresponding motor vehicle, which can adapt its driving behavior accordingly on the basis of the communicated risk assessment, in particular by correspondingly adapting function limits. This allows the fully automatic vehicle guidance function to be upgraded with a risk information describing a low risk by expanding the function limits, for example by working at higher speeds and/or faster adaptation of the vehicle dynamics, which increases the driver's acceptance and evaluation. On the other hand, if the risk information indicates a high risk in the sense of safety, the function limits may be restricted in order to rule out collisions/damage as far as possible.

As a result, further advantages can be seen in addition to increasing driver acceptance by avoiding an interpretation of driving behavior based on the "worst case" defined by the vehicle's general conditions. It is thus possible to provide automated driving functions with reduced technical effort on the motor vehicle side, for example in terms of sensors and/or computing power. The possible uses of autonomous motor vehicles in navigation environments, which cannot be mastered solely by vehicle technology, are being expanded. There is also the possibility of including an expanded information base, for example taking into account specific circumstances in local navigation environments, which can be described, for example, within the digital map.

The industrial implementation of fully automated vehicle guidance functions is also particularly favored by the present invention, since a clear separation of responsibility for risk assessment on the motor vehicle side and infrastructure side is made possible, in particular also by rather avoiding an excessive interdependency of the operation, for example a constant interaction between the infrastructure device and vehicle system, and instead the normal functional operation can be maintained unchanged on the basis of the information available on the motor vehicle side, after only boundary conditions, specifically the function limits, are adapted to the current traffic situation as a function of the preferably simple risk information. In particular, the present invention thus allows the fully automatic vehicle guidance functions to be upgraded on the basis of a dynamic risk assessment (hazard/property damage potential) on the basis of infrastructure-generated (environment sensor) information at runtime. This results in a situational adaptation (based on the consideration of the dynamic traffic situation) of the autonomous operation of motor vehicles with situation-dependent expansion/restriction of the function limits.

In a particularly preferred development of the method, it can be provided that the motor vehicles and/or further dynamic objects that communicate with the infrastructure device transmit at least one action parameter describing a maximum possible and/or planned dynamic to the infrastructure device, and the respective action parameters are taken into account during the determination of the risk information. This is extremely useful in particular with regard to a risk assessment in the context of the detection of the future behavior of the dynamic objects, since the action parameters substantially correspond to an assurance/limitation of the possible future dynamics. Ultimately, the action parameters thus describe assured and adhered to dynamic abilities, for example assured vehicle dynamics and/or a stopping distance adhered to, the action parameters preferably being made available dynamically by the motor vehicles and/or dynamic objects at runtime. For example, a maximum speed and/or a maximum acceleration and/or a direction parameter describing a maximum possible change in direction and/or a trajectory parameter describing a planned trajectory and/or an assured stopping distance can be used as the action parameter. It can also be seen that there is a connection with the function limits in autonomously operated motor vehicles in the navigation environment, so that the action parameters can be at least partially determined from the limit operation parameters and/or as these.

It should be pointed out here that it can be provided that dynamic objects that do not communicate with the infrastructure device and/or dynamic objects that do not provide any action parameters, for example pedestrians, can be assigned action parameters, in particular based on a classification of the corresponding dynamic object. For example, for pedestrians, their typical behavior and/or their typical dynamic range is known as dynamic objects and can be retrieved, for example, from a database.

It is particularly advantageous if the action parameters determine an area of action of the respective dynamic object and/or a collision probability with other dynamic objects, in particular over at least one prediction period, and are used in the determination of the motor motor-vehicle-specific risk information. Generally speaking, based on static data (digital map), for example the building geometry in the case of a parking garage, and dynamic data (the situation information), the infrastructure device continuously evaluates the risk for each motor vehicle that is communicating with the infrastructure device and is operated within the navigation environment at the current time, whereby the influence of the static objects, for example of obscurations by walls and/or parked vehicles, and the behavior of other road users, for example pedestrians walking near roads, can be taken into account. In particular, the use of collision algorithms, as are known in a similar, possibly differently parameterized form, from safety systems of motor vehicles is particularly suitable for the concrete evaluation. Ultimately, the behavior of other dynamic objects is predicted for a prediction period in the future in order to derive a collision probability, which can form the basis for the risk assessment and thus the risk information. In the prediction to be carried out in the context of such a collision algorithm, the action parameters prove to be particularly useful, since the number of possible behaviors to be covered and/or their weighting can be assessed much better.

Preferably, the determination of the risk information can include at least one of the past damage events and/or history information describing risk events, which is held and/or determined by the infrastructure device. Knowledge of problems that have occurred in the past, e.g. accidents and/or almost accidents, ultimately describes specific circumstances within the navigation environment and can be taken into account accordingly, for example by identifying particularly safety-critical points in basically known ways and, for example, marking or designating them accordingly within the digital map. This allows motor vehicles to exercise particular caution in places prone to accidents, especially when other dynamic objects are present in this area. In this way, further advantage is drawn from the broad information base available on the infrastructure side.

In an expedient refinement, the risk information can be determined by describing one of a plurality of discrete risk levels, the limit operation parameter sets to be set in each case being assigned to the risk levels. This results in operating modes assigned to the risk levels in the motor vehicles, at least described by the limit operation parameter sets, which can be set in accordance with the dynamic and static assessment of the traffic situation. In order to achieve the least complex but effective implementation of the procedure according to the invention and, in particular, to support the clear separation of responsibilities, it is therefore proposed to use an easy-to-use risk parameter as at least part of the risk information, which is to be used in particular for the selection of a limit operation parameter set which describes the risk level for the individual motor vehicle.

At this point, it should also be pointed out that the motor vehicle or specifically the vehicle system implementing the fully automatic vehicle guidance function independently interprets the risk information received and initiates supported behavioral changes on this basis. As a result, the separation of responsibilities that has already been indicated can be further propagated here.

The limit operation parameters can expediently describe a maximum permissible dynamic within the scope of the fully automatic vehicle guidance and/or permissible driving maneuvers. For example, maximum speeds and, in particular, also current speeds of the motor vehicle can be reduced in confusing areas and/or areas occupied by many dynamic objects. It is also conceivable to only permit or additionally activate certain driving maneuvers when the risk is low, and to allow more dynamic driving maneuvers overall by appropriately raising function limits with regard to the maximum permissible dynamics.

In an embodiment, it can be provided that at least one further operating parameter of the vehicle guidance function and/or the vehicle system and/or another vehicle system of the motor vehicle is adapted as a function of the risk information. The other vehicle system can in particular be a safety system of the motor vehicle. For example, the further operating parameters can specifically relate to the preconditioning of at least one of the at least one other vehicle system, in particular a safety system, and/or the detection properties of at least one sensor of the motor vehicle. If, for example, a risk class and/or a spatial risk area, and/or a risk object, which can be a static and/or a dynamic object, is also transmitted as risk information, it is in particular also possible to adapt the operation of the motor vehicle beyond the function limits to the more specific risk information in this case. For example, the motor vehicle sensor system and/or the motor vehicle computing capacity can be focused on areas appropriate for a risk indicated by the risk information and the like. If there is a high risk of collision, safety systems can be preconditioned, for example, to increase safety by adapting their operating parameters, so that, for example, a faster reaction is possible if a collision actually occurs.

As already mentioned, in particular the risk information for the individual motor vehicles, but preferably also the action parameters, are updated as often as possible, and are thus kept up-to-date, for example by performing a cyclical re-determination of the risk information and/or passing updated parameters to the infrastructure device when they change. This applies in particular to the adjustment of function limits and consequently also to the corresponding action parameters, so that a kind of "feedback" is created for improvements coordinated in this way.

As already mentioned, the actual implementation of the vehicle guidance function within the motor vehicle is preferably influenced as little as possible, but preferably only its boundary conditions are adapted on the basis of the risk assessment on the part of the infrastructure device. It can be provided that the trajectory calculation and/or the collision calculation takes place within the framework of the vehicle guidance function within the motor vehicle and depending on sensor data determined by the motor vehicle sensor system. In particular, an exclusive dependency with regard to the sensor data on the motor vehicle sensor system can be provided in order to implement the possible clear separation of responsibilities already described. It can therefore be said that the fully automatic vehicle guidance function within the motor vehicle can remain technically unchanged, since the risk information only influences the parameterization. This allows a simplified implementation of the procedure according to the invention, since ultimately only additions, for example the changeability of the limit operation parameters, are necessary.

In an embodiment of the present invention, it can be provided that in the digital map of the navigation environment, which is also present in the motor vehicles, sub-areas for which a determination of the risk information is possible, in particular due to the coverage by the environment sensors, are marked, where the sub-areas at the route planning within the motor vehicle are taken into account. The route planning can preferably be carried out maximizing the crossing of sub-areas. In other words, sub-areas in which the motor vehicle can be supported by risk information from the infrastructure device are stored in the digital map and marked accordingly. This enables advantageous planning of the driving processes on the motor vehicle side, for example to plan a route with maximum support coverage for more restricted motor vehicles. It is known for the sub-areas that dynamically provided risk information can be obtained through the active infrastructure.

In addition to the method, the present invention also relates to a motor vehicle, comprising a vehicle system that implements a fully automatic vehicle guidance function at least within a navigation environment and a communication device for communication with an infrastructure device associated with the navigation environment, where function limits of the vehicle guidance function are defined by limit operation parameters of the vehicle guidance function, where the motor vehicle is thereby distinguished by the fact that a control unit of the vehicle system is designed to adapt the limit operation parameters as a function of risk information received from the infrastructure device to tighter function limits in the case of risk information describing a higher risk and to wider function limits in the case of risk information describing a lower risk. The motor vehicle is therefore designed to use risk information provided by an external infrastructure device and can be used in the context of the method according to the invention. All statements regarding the method according to the invention, which relate to the motor vehicle, can be applied accordingly to the motor vehicle according to the invention, so that the advantages already mentioned can also be obtained therewith.

It is also conceivable to implement a communication system in a navigation environment with an infrastructure device and a plurality of motor vehicles, where the infrastructure device and respective control units of the motor vehicles are designed to carry out the method according to the invention.

Further advantages and details of the present invention shall become apparent from the embodiments described below and by means of the drawings. In the drawings: FIG. 1 shows a flowchart to explain the method according to the invention, FIG. 2 shows schematically a navigation environment with traffic situations, and FIG. 3 shows a schematic diagram of a motor vehicle.

In the following, an embodiment of the method according to the invention is to be presented, as can be carried out as a navigation environment in a parking environment, in particular a parking garage. The parking environment includes an infrastructure device and environment sensors that deliver their environment sensor data to the infrastructure device. Motor vehicles operated within the parking environment use a communication device on the motor vehicle to establish a communication connection via a communication device on the infrastructure device, for example using WLAN or LTE-V. This initial setup of a communication link 1 between the infrastructure device (domain I) and a motor vehicle (domain II), which is provided, for example, when entering the parking area and which in the present case has a vehicle system that implements a fully automatic vehicle guidance function, is indicated by steps S1 and S2 in FIG. 1. After the registration of the motor vehicle by establishing the communication link 1, the motor vehicle receives a digital map 3 of the parking environment from the infrastructure device, as symbolized by the arrow 2, which is used by the motor vehicle in a step S3 to determine a route to, in particular, the parking space allocated to the infrastructure device.

In this case, a special feature is given in step S2, after 3 sub-areas are marked on the digital map, in which, based on existing environment sensors of the navigation environment, there is a possibility of assisting the motor vehicle in fully automatic vehicle guidance by risk assessment by the infrastructure device, as will be set out in more detail below. The route in step S3 is determined in such a way that maximum support along the route is possible, and consequently as large a portion of the route as possible leads through sub-areas in which support is possible.

During operation in the navigation environment, autonomous operation of the motor vehicle takes place continuously by means of the fully automatic vehicle guidance function, as indicated by step S4. Sensors for operating data and environmental data of the motor vehicle are used for the trajectory calculation and collision calculation. The function limits of the vehicle guidance function in step S4 are described by limit operation parameters of the vehicle guidance function. Function limits can describe the maximum permissible dynamics and/or permissible/non-permissible maneuvers.

These function limits influence the maximum dynamics that can occur within the motor vehicle and the assurable stopping distance. This information is regularly updated according to arrow 4 and sent to the infrastructure device as an action parameter 5 of the motor vehicle along with further action parameters 5 which relate to the currently planned further travel sequence of the motor vehicle, in particular the trajectory planning.

The input data, in a step S5, is updated continuously, e.g., cyclically, by the infrastructure device in order to determine a risk assessment in the form of risk information 8 for each motor vehicle operated within the navigation environment in a motor-vehicle-specific manner, which is why environmental data 6 of the already mentioned environment sensors and optionally additional data from information transmitted to the motor vehicles can be used to determine traffic situation information describing current dynamic objects in the navigation environment. This traffic situation information is used together with the digital map 3 describing the stationary objects and properties of the navigation environment, the action parameters 5 and, in the present case, also history information 7, which can also be stored in the digital map 3 and describes the damage and/or risk cases that have occurred in the past, to determine the risk information 8 for the individual, autonomously operated motor vehicles communicating with the infrastructure device in the navigation environment. Here, dynamic objects that do not communicate with the infrastructure device and dynamic objects that do not supply action parameters 5, for example pedestrians, are assigned action parameters from a database, the dynamic object being classified accordingly beforehand. The action parameters 5 prove to be particularly useful with regard to a prediction of the traffic situation over a prediction period taking place in step S5 by means of a collision algorithm in order to determine a collision probability of various static and/or dynamic objects with one another as a guiding value for the risk assessment.

In the present embodiment, at least one risk level is determined as risk information 8, to which limit operation parameter sets are assigned within the motor vehicles and, if appropriate, further operating parameter sets, which will be discussed in more detail below. For example, a number increasing with increasing risk can be used as the risk level, for example natural numbers from one to six or the like. The resulting risk information 8 for the motor vehicle assigned to domain II is also shown in FIG. 1 and is then transmitted to the motor vehicle in accordance with arrow 9, so that the vehicle is always aware of the current risk assessment of the infrastructure device.

The risk information 8 is used in a step S6 on the part of the motor vehicle to adapt the behavior of the vehicle guidance algorithm, in particular by setting the limit operation parameters in accordance with the limit operation parameter set assigned to the risk level. In addition, additional measures are conceivable, at least for some risk levels and/or any further risk information that may be provided, for example preconditioning safety systems as other vehicle systems of the motor vehicle by adapting operating parameters and/or adapting detection properties of at least one sensor of the motor vehicle, for example focusing on one risk area.

At a risk level that currently indicates a low risk, the vehicle guidance algorithm can be granted greater freedom according to step S4, for example greater permitted speeds and/or other dynamic parameters, which means that the function limits have been expanded. On the other hand, the function limits can also be restricted if there is a high risk. It is preferred if only a re-parameterization of the function limits takes place and the other operation of the vehicle management algorithm remains unaffected, which separates domain II from domain I sufficiently clearly, enables simple technical implementation, and allows a clear assignment of responsibility.

Steps S5 and S6 are carried out continuously while the motor vehicle is being operated in the navigation environment, which means in particular frequently repeated cyclically, for example every second or more frequently. In this context, communication can expediently only take place in the event of a change in terms of the action parameters 5 or the risk information 8.

FIG. 2 shows a schematic diagram of the navigation environment 10 designed as a parking environment with two traffic situations 11, 12 explaining the method. The infrastructure device 13 is only indicated in this case; for the sake of clarity, communication links to the permanently installed, stationary environment sensors 14, which can include cameras and/or distance-measuring sensors, for example, are not shown in any more detail. Various motor vehicles 15, 16, 17 are operated autonomously within the navigation environment 10, their communication links 1 with the infrastructure device 13 being again indicated. A pedestrian 18 is shown as a further dynamic object in traffic situation 11, for example.

As can be seen, the traffic situation 11 due to the wall 19 can be classified as confusing and risky, and in the present case, due to the many dynamic objects (motor vehicles 15, 16 and pedestrians 18), there is a traffic situation 11 that can actually be assessed as extremely critical. The motor vehicles 15, 16 cannot perceive themselves with their motor vehicle-side environment sensors; there is also a pedestrian 18 who is moving near and in the direction of the road. The traffic situation 11 would therefore be rated with a high risk level as risk information 8 for the motor vehicles 15, 16, which drive accordingly cautiously in step S6 by restricting their function limits.

It is different in the traffic situation 12, where there is also a confusion due to walls 19, but it is known due to the environment sensors 14 of the infrastructure device 13 that the motor vehicle 17 is currently the only dynamic object in the relevant area, so that despite the confusing situation, an autonomous operation is even possible in an expanded scope thanks to a lower risk level.

FIG. 3 finally shows a schematic diagram of a motor vehicle 20, as can be used in the method according to the invention. The motor vehicle 20 comprises a vehicle system 21 for realizing a fully automatic vehicle guidance function, the operation of which is controlled by a control unit 22 which, in addition to carrying out step S4, is also designed to carry out steps S2, S3, and S6. Input data are supplied by environment sensors 23 of motor vehicle 20, which can include cameras, radar sensors, lidar sensors, and the like, for example. Further input data that describe the operating state of the motor vehicle 20 can originate from further information sources of the motor vehicle 20, in particular also from operating sensors 24 such as an inertial platform. The communication link 1 to the infrastructure device 13 can be established via a motor vehicle-side communication device 25. The vehicle system 21 is also connected to other vehicle systems, here security systems 26.

The invention claimed is:

1. A method for adjusting a vehicle guidance function, which is performed by a vehicle system of a motor vehicle during an operation of the motor vehicle in a predefined navigation environment, the method comprising:
   receiving, from a stationary infrastructure device, at least one piece of risk information,
   wherein the at least one piece of risk information is determined descriptively of one of a plurality of discrete risk levels,
   wherein the stationary infrastructure device is associated with the predefined navigation environment,
   wherein function limits of the vehicle guidance function are determined by limit operation parameters of the vehicle guidance function and describe at least permissible maneuvers of the motor vehicle,
   wherein current traffic situation information describing dynamic objects in the predefined navigation environment is determined by the stationary infrastructure device using environment sensors of the predefined navigation environment, at least some of the environment sensors are fixedly installed so as to be stationary,
   wherein the current traffic situation information is used, together with a digital map describing stationary objects and properties of the predefined navigation environment, to determine the at least one piece of risk information for the motor vehicle among the dynamic objects,
   wherein the at least one piece of risk information describes at least one of a hazard potential or property damage potential, and
   wherein limit operation parameter sets are assigned to the plurality of discrete risk levels;
   in response to the at least one piece of risk information describing a higher risk, adjusting the limit operation parameters to tighter function limits in accordance with a limit operation parameter set associated with the one of the plurality of discrete risk levels; and
   in response to the at least one piece of risk information describing a lower risk, adjusting the limit operation parameters to wider function limits in accordance with the limit operation parameter set associated with the one of the plurality of discrete risk levels.

2. The method according to claim 1, further comprising:
   transmitting, to the stationary infrastructure device, at least one action parameter, wherein the at least one action parameter is used for the determination of the at least one piece of risk information.

3. The method according to claim 2, wherein the at least one action parameter comprises at least one of a maximum speed, a maximum acceleration, a direction parameter describing a maximum possible change of direction, a trajectory parameter describing a planned trajectory, and an assured stopping distance.

4. The method according to claim 2, wherein the at least one action parameter is determined at least partially from the limit operation parameters.

5. The method according to claim 2, wherein the at least one action parameter is determined at least partially from at least one of a maximum speed, a maximum acceleration, a direction parameter describing a maximum possible change of direction, a trajectory parameter describing a planned trajectory, and an assured stopping distance.

6. The method according to claim 2, wherein the at least one action parameter determines at least one of an area of action of a respective dynamic object or a collision probability with other dynamic objects, over at least one prediction period.

7. The method according to claim 1, wherein the at least one piece of risk information is determined using at least one of past damage events, history information describing risk events, which is held or determined by the stationary infrastructure device.

8. The method according to claim 1, wherein the limit operation parameters describe at least one of a maximum permissible dynamic within a scope of the vehicle guidance function or permissible driving maneuvers.

9. The method according to claim 1, further comprising:
adapting, as a function of the at least one piece of risk information, at least one of at least one further operating parameter of the vehicle guidance function, at least one further operating parameter of the vehicle system, or at least one further operating parameter of another vehicle system of the motor vehicle.

10. The method according to claim 9, wherein the at least one further operating parameter of the other vehicle system relates to at least one of a preconditioning of a safety system or detection properties of at least one sensor of the motor vehicle.

11. The method according to claim 1, further comprising:
performing at least one of a trajectory calculation or a collision calculation within a framework of the vehicle guidance function within the motor vehicle using sensor data determined by a sensor system of the motor vehicle.

12. The method according to claim 1, wherein sub-areas in the digital map of the predefined navigation environment for which a determination of the at least one piece of risk information is possible are marked, and the method further comprises:
using the sub-areas at the motor vehicle for route planning.

13. The method according to claim 12, wherein the route planning maximizes a crossing of sub-areas.

14. The method according to claim 1, wherein the predefined navigation environment is a parking environment.

15. A motor vehicle, comprising:
a vehicle system configured to implement a vehicle guidance function at least within a navigation environment; and
a communication device configured to communicate with an infrastructure device associated with the navigation environment and configured to receive risk information from the infrastructure device,
wherein the risk information is determined descriptively of one of a plurality of discrete risk levels,
wherein function limits of the vehicle guidance function are determined by limit operation parameters of the vehicle guidance function and describe at least permissible maneuvers of the motor vehicle,
wherein limit operation parameter sets are assigned to the plurality of discrete risk levels, and
wherein a control unit of the vehicle system is configured to adapt the limit operation parameters, as a function of the risk information, to tighter function limits in response to the risk information describing a higher risk and to wider function limits in response to the risk information describing a lower risk in accordance with a limit operation parameter set associated with the one of the plurality of discrete risk levels.

16. The method according to claim 1, wherein:
the adjusting the limit operation parameters to the tighter function limits comprises decreasing adaptation speed of dynamics of the motor vehicle, and
the adjusting the limit operation parameters to the wider function limits comprises increasing the adaptation speed of the dynamics of the motor vehicle.

17. The method of claim 1, further comprising:
adapting operating parameters of at least one sensor of the motor vehicle or detection properties of the at least one sensor to focus on a risk area associated with the at least one piece of risk information.

18. The method according to claim 1, wherein the adjusting the limit operation parameters to the wider function limits comprises:
permitting one or more driving maneuvers of the motor vehicle, or
activating the one or more driving maneuvers of the motor vehicle, or
allowing dynamic driving maneuvers of the motor vehicle.

* * * * *